United States Patent
Loggins

(10) Patent No.: US 7,918,638 B1
(45) Date of Patent: Apr. 5, 2011

(54) BED SCRAPING APPARATUS FOR EFFICIENT BULK MATERIAL DUMPING

(76) Inventor: Walter L. Loggins, Remlap, AL (US)

( * ) Notice: Subject to any disclaimer, the term of this patent is extended or adjusted under 35 U.S.C. 154(b) by 195 days.

(21) Appl. No.: 12/359,280

(22) Filed: Jan. 23, 2009

Related U.S. Application Data

(60) Provisional application No. 61/011,926, filed on Jan. 23, 2008.

(51) Int. Cl.
B60P 1/06 (2006.01)

(52) U.S. Cl. ........ 414/469; 414/492; 414/509; 414/513; 298/1 B

(58) Field of Classification Search .................. 414/469, 414/492, 509, 513; 298/1 B
See application file for complete search history.

(56) References Cited

U.S. PATENT DOCUMENTS

| | | | |
|---|---|---|---|
| 1,485,631 A | 3/1924 | Shea | |
| 2,303,033 A | 11/1942 | Elliot | |
| 2,463,987 A | 3/1949 | Malone et al. | |
| 3,164,410 A | 1/1965 | Robinson et al. | |
| 3,626,489 A | 12/1971 | Pioch | |
| 3,827,753 A | 8/1974 | Pitts | |
| 3,921,832 A * | 11/1975 | Smith | 414/509 |
| 3,975,052 A | 8/1976 | Pitts | |
| 4,062,136 A * | 12/1977 | Steiger | 37/426 |
| 4,099,636 A | 7/1978 | Frenette | |
| 4,431,360 A * | 2/1984 | Maeno | 414/294 |
| 5,002,340 A | 3/1991 | Loggins | |
| 5,228,750 A | 7/1993 | Hagenbuch | |
| 5,456,521 A | 10/1995 | Moyna | |
| 6,250,873 B1 * | 6/2001 | Stragier | 414/511 |
| 6,672,822 B1 | 1/2004 | Moyna | |
| 7,111,908 B1 | 9/2006 | Mills | |
| 2008/0145200 A1 | 6/2008 | Hagenbuch | |

* cited by examiner

Primary Examiner — Michael S Lowe
(74) Attorney, Agent, or Firm — Mark Clodfelter

(57) ABSTRACT

A dump bed scraping apparatus is disclosed. A scraper portion includes a frame on a floor of an inclinable dump bed that extends the width of the dump bed, and which supports a plurality of scraper blades movably disposed in forward and rearward directions along a floor of the dump bed so as to scrape substantially the entire floor of the dump bed clear of clumped material when the dump bed is inclined. Movement of the frame is facilitated by extensible links attached between a stationary frame supporting the dump bed and members of the scraper frame, which serve to move the scraper frame and scraper blades when the dump bed is inclined and lowered. A pivoting connector attaches one end of the extensible links to the scraper frame through a slot in the dump bed.

24 Claims, 7 Drawing Sheets

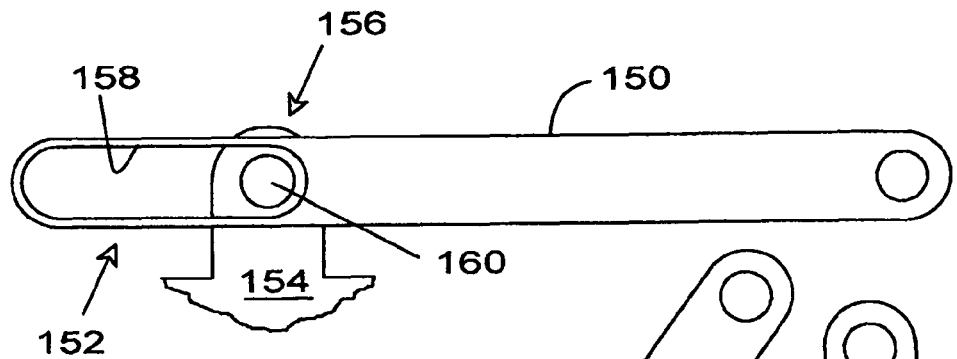
Fig. 5a
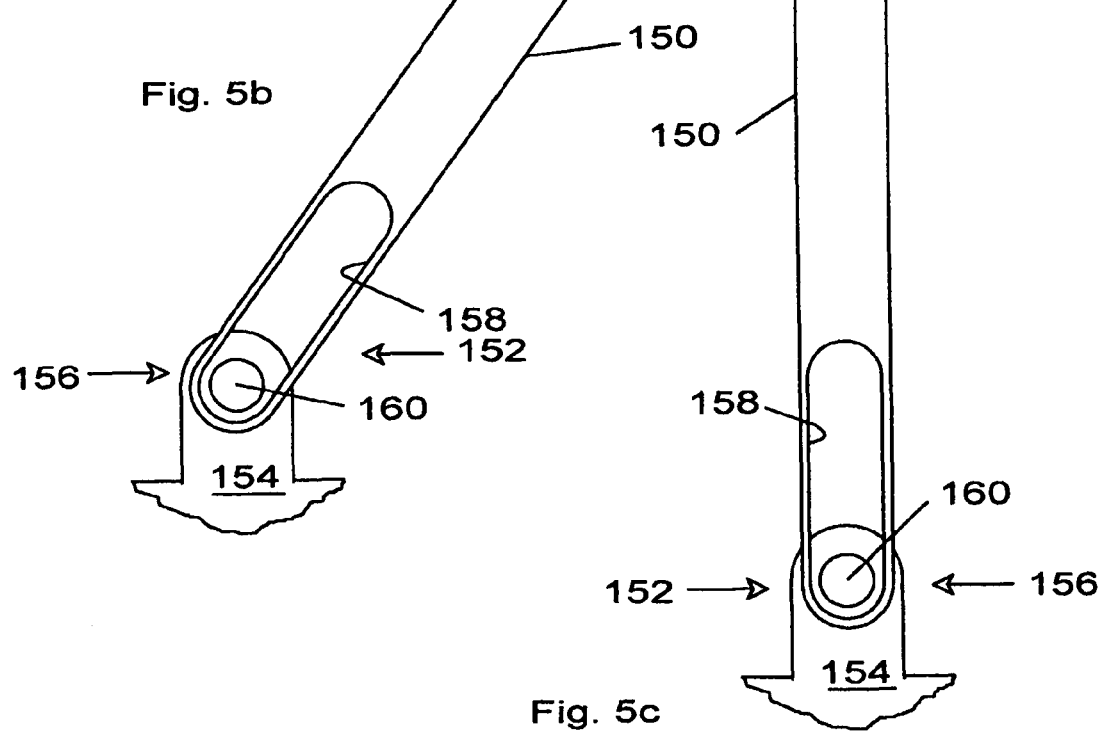
Fig. 5b
Fig. 5c

US 7,918,638 B1

BED SCRAPING APPARATUS FOR EFFICIENT BULK MATERIAL DUMPING

CONTINUING APPLICATION DATA

This application claims the benefit of provisional application No. 61/011,926, filed Jan. 23, 2008.

FIELD OF THE INVENTION

The present invention relates generally to containers that are inclined to gravitationally discharge their bulk material load, and particularly to bed scraping apparatuses for assisting dumping of bulk material that may stick in the bed of a dumping container, thereby improving efficiency of dumping operations.

BACKGROUND AND RELATED ART

For purposes of this disclosure, "bulk material" as used herein will refer to substantially loose materials such as, but not limited to, soils and soil components such as silt, sand, clay, gravel, and coal and ores as transported within or from mining and processing operations. Examples further include loose aggregate materials and other multicomponent materials including those with liquid components and/or those that exhibit flow characteristics such as asphalt and unset concrete mixes. Such materials have a tendency to stick and clump to a bed of a dump truck or other dumping vehicle so that only part of a load is dumped when the bed is fully elevated to a dumping position.

"Dump body" as used herein refers to a container for temporary storage and possibly transport of a load of bulk material in which the container is tilted in order to gravitationally discharge its load. Tilting is by rotation of the dump body about an approximately horizontal axis affixed to a base, which may be the ground, or a frame resting on or attached to ground for stationary storage facilities or, for transport vehicles, a base may be a frame of a truck as with a dump truck or a frame of an ore car of a mining operations train. A dump body has a bed which, as used herein, is a lower surface including a floor of the dump body and from which bulk material is gravitationally discharged by dump body inclination, hereafter referred to as dumping.

A common problem with dumping certain bulk materials, such as with moist, compactible, and/or otherwise sticky bulk materials, with conventional dump bodies is that effective volumetric capacity of the dump body is substantially diminished because appreciable bulk material may tend to clump or adhere to the bed of the dump body after a dumping operation. In these situations, residual material clinging to a bed of a truck may be substantial after just one or a few loads, thus significantly reducing efficiency of transport and dumping operations. With these conventional dump body systems, residual material must be removed manually, but this consumes valuable equipment operations time and requires considerable physical exertion. In other instances, a truck drive may be engaged while the dump body is elevated to the dump position, and the vehicle "jogged" in an effort to dislodge residual material clumped to sides and floor of the dump body. Such a practice is obviously to the detriment of the dump body and transport vehicle.

Applicants' previous patent (U.S. Pat. No. 5,002,340) which is incorporated herein in its entirety by reference, discloses a dump truck bed scraper that is selectively actuated to substantially remove residual adhering bulk material while a truck's dump body is inclined for dumping. This bed scraper apparatus includes a bed scraper carriage that is pulled along a dump body's bed floor via cables driven by an electric winch. The scraper carriage is provided with rigidly attached scraping blades that contact and dislodge adhering bulk material from the floor of the bed. While applicant's prior truck bed scraping apparatus successfully removes residual material during dumping operations, such apparatus is expensive to fabricate and install, occupies considerable space in and around a dump body, is complex mechanically and is therefore maintenance intensive. In addition, the systems operating the scraper are separate from the dump body systems, and must be separately actuated.

Considering the deficiencies described in the aforementioned dump truck bed-cleaning system, it is an object of this invention to provide an inexpensive, reliable and mechanically robust dump body bed cleaning or clearing system that is actuated by a dumping operation of the dump body, and requires no additional activation by an operator. Other objects of the invention will become apparent upon a reading of the following disclosure.

BRIEF DESCRIPTION OF THE DRAWINGS

FIGS. 5a-5c depict, by way of example, an embodiment of an extensible link in various positions during operation.

DETAILED DESCRIPTION OF INVENTIVE EMBODIMENTS

Figure 1:
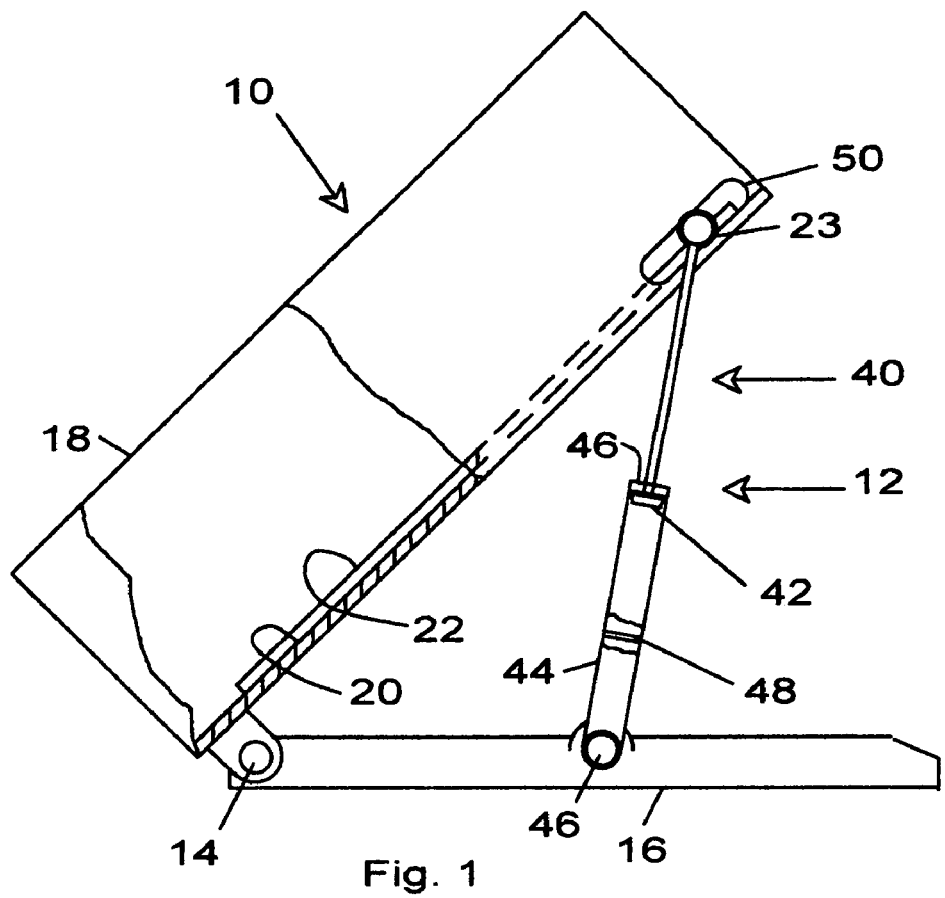
FIG. 1 depicts one embodiment of the instant invention.
Figure 4:
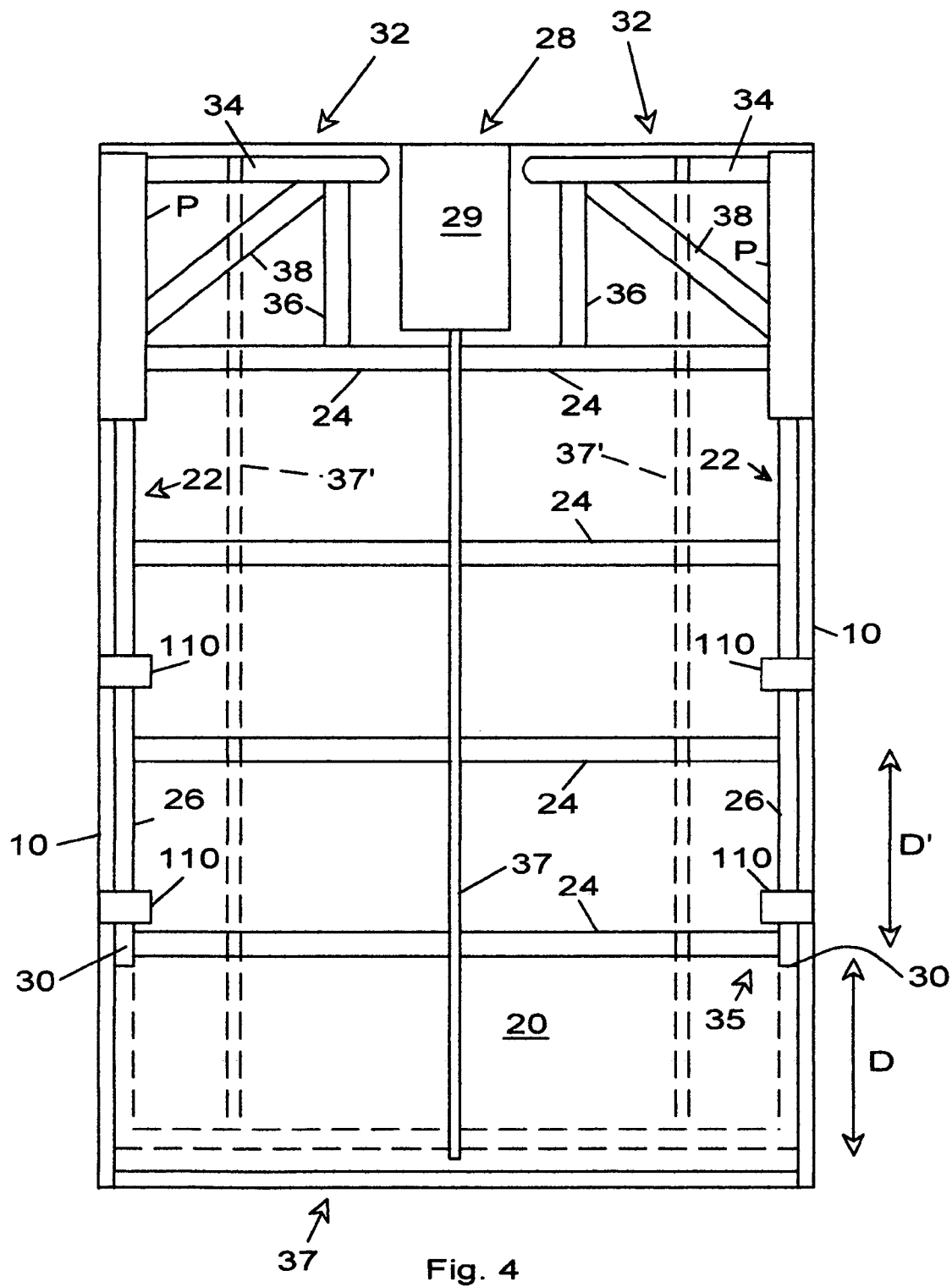
FIG. 4 depicts an embodiment of a scraper carriage of the instant invention.

A first representative inventive embodiment, and by way of example only, is depicted in FIG. 1 as an instantaneous configuration during a dumping operation of a dump truck bed or the like. FIG. 1 displays a side view of a tiltable dump body 10 and one of a pair of link mechanisms 12 located on each side of dump body 10. For clarity, the link mechanism components are shown exaggerated in size. Dump body 10 is conventionally connected via a rotating dump body hinge 14 to a base 16 which may be, for example, a frame of a dump truck or other vehicle. Dump body 10 has a container 18, which, for illustrative purposes of this example embodiment, has a planar bed floor 20. A scraper carriage 22 lies on bed floor 20 of dump body 10. Scraper carriage 22, as shown in FIG. 4, includes a plurality of longitudinally-spaced transverse scraper plates or blades 24 rigidly attached to longitudinal carriage frame members 26 movably disposed along sides of floor 20 of dump body 10. Edges across the scraper blades may also be beveled to facilitate scraping of the dump bed. Carriage frame members 26 (FIG. 4) extend as shown along sides of the floor of the dump body when dump body 10 is in a lowered position from a front end 28 of the dump body floor to points 30 on the dump body floor, points 30 being approximately 3 feet or so from the dumping end of the dump body, as will be further explained. At the front end 32 of carriage 22, shorter transverse frame members 34 each extend from an end of a respective frame member 26 to near a side of a "doghouse" 36, a boxlike structure enclosing components for elevating the front end of the dump body to a dumping position. From an end of each of frame members 34, a short longitudinal frame member 36 extends to and is attached to a first scraper blade 24. Diagonal scraper blades 38 extend as shown between frame members 34 and the first scraper blade 24, frame members 34, 36 and scraper blades 38 forming scraper assemblies that clear the area of the floor between sides of doghouse 36 and interior sides of dump body 10.

Other designs of blades and frame are contemplated, as will be described later herein. Not shown is a means of inclining the dump body 10, which is conventional in nature, and typically is one or more hydraulic cylinders connected between frame 16 (FIG. 1) at an opposite end thereof from hinge 14 and a right end of the dump body. Significantly, scraper carriage 22 is operated by the operation of raising and lowering dump body 10. For a dump truck, a hydraulic cylinder connected as described elevates one end of dump body 10 so that the load is dumped from an opposite end.

As displayed in FIG. 1, link mechanism 12 includes an extensible link 40 that is variable in length between a minimum length as determined by a lowered position of the dump body (FIG. 2a) and a maximum length determined by a fully raised dump body (FIG. 1). Link mechanism 12, and as shown in the example embodiment of FIG. 1, may be embodied as a captured telescoping rod-in-cylinder assembly, but other mechanical equivalents are also contemplated. Here, extensible link 40 may be connected to a side, or a bottom as will be further explained, of scraper carriage 22 via a slot 50 by a pivoting connection 23, and is provided with a stop 42 within a guide 44 within which link 40 telescopes. Guide 44 may be a cylinder into which link 40 movably extends, but which also may be a strap of metal bent or configured in an elongated U-shape. Guide 44 is provided with two stops, a first stop 46 at an end of guide 44 that limits outward travel of link 40 when stop 42 of link 40 abuts stop 46, and a second, interior stop 48 within guide 44 that limits inward travel of link 40 when stop 42 of the link abuts interior stop 48. Guide 44 for link 40 is pivotally attached at one end at 46 to frame 16. With this construction, and with link 40 attached to scraper carriage 22, when link 40 reaches the limit of its outward movement from guide 44 as the dump bed is being elevated, scraper carriage 22 and the attached blades 34 begin to be dragged along the bed of the truck, dislodging any material that may be stuck or clumped to bed 20. Positioning of link 40, it's length and length of slot 50 is such that the distance D the scraper covers, as shown in FIG. 4, is approximately the length of a rearward portion of dump bed floor 20 not covered by the scraper assembly, this length also being approximately a distance between the scraper blades so that when the scraper carriage is dragged along the bed for distance D, essentially the entire floor of the bed is scraped clear of material. For a conventional dump truck with a dump bed 16 feet in length, distance between the scraper blades and distance D may be on the order of approximately 3 feet or so. Thus, with a three foot stroke, 4 scraper blades about three feet apart and extending the width of the dump bed and scraper assemblies on each side of the doghouse would suffice to clear the bed of a 16 foot dump truck. Of course, it should be apparent to those skilled in the relevant arts that other stroke lengths may be employed, with a different number of scraper blades spaced apart a distance generally equal to the stroke length in order to scrape the full length and breadth of a dump bed.

Links 40 may be constructed such that an angle the dump bed is inclined may be between about 30 to 60 degrees or so from horizontal before the scraper assembly begins its movement to clear the dump bed. Where the angle is steeper, spacing and number of the blades may be adjusted to accommodate a shorter stroke of the scraper assembly. Likewise, where the angle is a shallower angle, fewer blades may be used, with a corresponding longer stroke. The selected inclination at which the scraper frame begins to move may be selected in accordance with a tendency of the material to clump in the dump bed. For instance, where wet dirt contains a high clay content, the inclination at which the scraper assembly begins to move may be selected to be from about 45-60 degrees, and where the load is gravel the inclination may be from about 30-50 degrees.

As stated, link mechanism 12 (FIG. 1) further includes a pivoting hinge 46 that rotatably connects a lower end of guide 44 to frame or base 16, and a pivoting carriage hinge 23 or the like that rotatably connects an upper end of each link 40 to a front portion of carriage frame 22. Again, it is reiterated that there typically would be an extensible link mechanism 12 mounted on each side of the dump bed to respective front portions of scraper carriage 22 in order to equalize the forces on carriage 22, although in some embodiments a single extensible link 12 may be mounted between an appropriate frame member and the scraper blade or carriage just behind the doghouse along a longitudinal centerline of the dump bed. Binding of the scraper carriage would be prevented as will be further explained.

Note that FIG. 1 shows carriage hinge 23 as having an instantaneous location coinciding with a mid-stroke of scraper carriage 22, with stop 42 of link 40 contacting stop 46 of guide 44 so as to limit extension of link 40, thereby dragging carriage 30 downward across the bed as the bed continues to be raised to its fully upright position. Mechanical connection of carriage hinge 23 of link 40 and carriage frame 22 is via an access slot 50 (shown enlarged for clarity) through a side of dump body 10. In practice, slot 50 need only be slightly wider than a bolt or other connecting member holding hinge 36 in place. Where a bolt is used as the connecting member between the scraper carriage and end of link 40, and by way of example, a ¾ inch bolt, the slot in the side of the dump body would need to be only slightly wider than ¾ inch, or perhaps 1 inch or so in width. Also, other bolt sizes may be used, as should be apparent to one skilled in the relevant arts. As should be apparent, slot 50 is aligned with intended movement of carriage frame 22 proximally along bed floor 20, and is of a length to accommodate the intended stroke of the scraper carriage. It should be noted that carriage hinge 23 may also be embodied, for example, as a boss extending from a side of carriage frame 22 extending through slot 50 and rotatably captured by a through hole in an upper end of link 42. In another embodiment, a large, elongated bolt may be attached to carriage frame 22, and extend to rotatably engage an end of link 40.

Figure 2A:
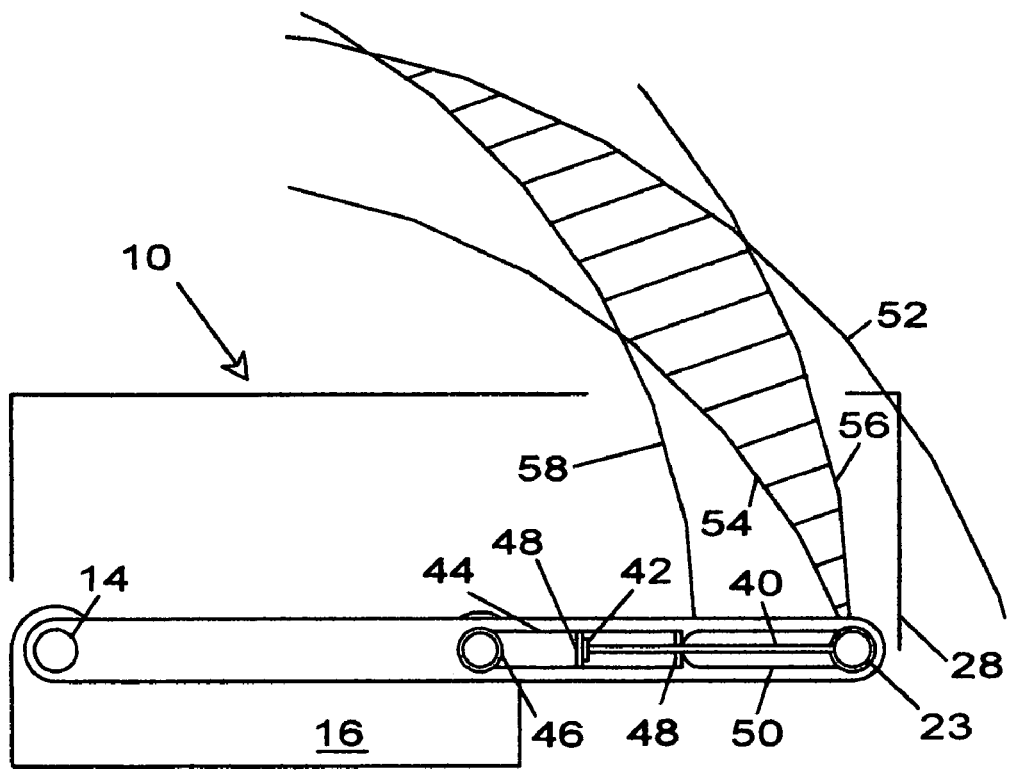
FIGS. 2a-2c are a series of schematic diagrams illustrating interrelated movements of one embodiment's elements during a dumping operation.
Figure 2B:
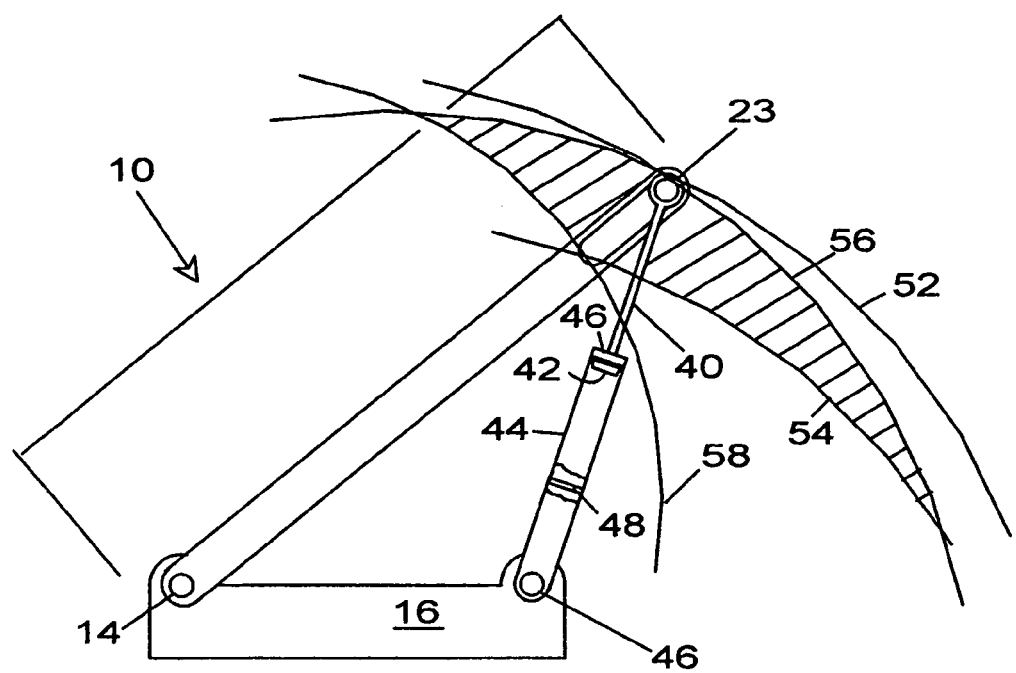
Figure 2C:
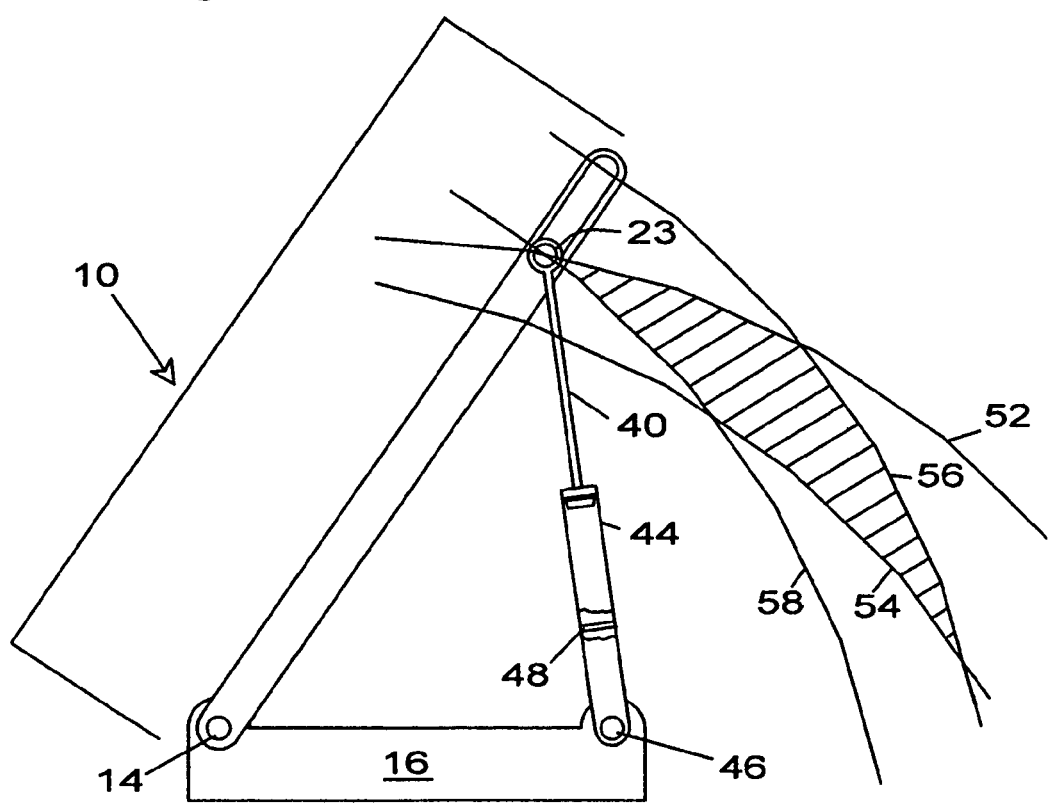

FIGS. 2a-2c depict a schematic representation of the embodiment displayed in FIG. 1, and which is useful for describing interacting movements of various elements of the invention for configurations successively achieved with inclination of dump body 10 during dumping a load of bulk material. Additionally displayed in FIGS. 2a, 2b and 2c for purposes of kinematic description are independent (i.e. disconnected from carriage hinge 23) locus 52 of the rotational path of the upper end of link 40 with the link at its minimum length and maximum length. Link 40 upper end location is thus independently constrained to be on or between locus 52 and locus 54. Similarly displayed in FIG. 2a are independent (i.e., disconnected from extensible link 42) locus 56 of carriage hinge 23 rotational path for scraper carriage 22 fixed at a pre-scrape upper position and locus 58 of carriage hinge 23 rotational path for scraper carriage 22 fixed at a completed-scrape lower position. Carriage hinge 23 location is thus independently constrained to be on or between locus 56 and locus 58. With the upper end of link 40 rotatably connected to scraper carriage 22 at carriage hinge 23, possible carriage hinge 23 locations are therefore those in which both sets of aforementioned independent constraints are simultaneously satisfied. In FIGS. 2a-2c, such possible carriage hinge 23 locations are indicated by the shaded regions of FIGS. 2a-2c, i.e., where operable independent regions overlap.

Referring now to FIG. 2a, dump body 10 is in a substantially horizontal orientation prior to start of a dumping operation. As shown, extensible link 40 is at its minimum length and carriage hinge 23 is at an extreme right most position corresponding to scraper carriage 22 being at its pre-scrape position as shown in FIG. 4. Upon initiating a dumping operation, the front end 28 of dump body 10 is inclined upward as shown, with a rearward portion of the dump body rotating about hinge 14. Likewise, as the dump body is inclined, guide 44 of extensible link 40 rotates about rotatable hinge 14, and an end of link 40 rotates about carriage hinge 23, thus producing an upwardly increasing range of possible carriage hinge 23 positions. However, because scraper carriage 22 and associated scraper blades 24 are underneath a load of dirt, gravel, rock or other bulk material and thus constrained within the dump body, carriage hinge 23 will remain at its upper locus 56 while extensible link 40 freely lengthens by virtue of stop 42 freely moving within guide 44. Consequently, during this initial inclination of the dump body 10, no movement of the scraper carriage or scraper blades occurs, which is desirable because dump body 10 is not yet sufficiently inclined to discharge a significant amount of its load. Were the scraper blades to be moved at this point, the downward pressure of the load against the scraper blades may cause them to be subject to damage and/or excessive wear and tear.

With further inclination of dump body 10, a configuration is achieved as depicted in FIG. 2b in which link 40 reaches its maximum length, with stop 42 abutting stop 46 as described. In this position, most of the load should already be dumped, lightening the load against the scraper blades and creating a condition wherein the bed is ready for scraping. At this point, further inclination of dump body 10, with stops 42 and 46 contacting each other, causes link 40 to pull scraper carriage 22 along bed floor 20 via carriage hinge 23, thus achieving scraping of bed floor 20, clearing the bed floor of any clumped material that may be present.

A final configuration is reached with greatest inclination of dump body 10 as depicted in FIG. 2c. At this configuration, link 40 has pulled scraper carriage 22 its full scraping stroke, as shown by dashed line portion of FIG. 4, with the scraping blades 24 having effectively scraped bed floor 20 to cause dislodged bulk material to be gravitationally discharged from bed floor 20.

Following dumping of the load, scraping carriage 22 is automatically returned to its pre-scrape configuration by reducing inclination of dump body 10 until it is again substantially horizontal as depicted in FIG. 2a. Observe especially that prior to container 10 being fully lowered, link 40 shortens to its minimum length and stop 42 "bottoms out" against lower stop 48 (FIGS. 1, 2a) of guide 44. This pushes scraper carriage 22 along bed floor 20 to its initial pre-scrape position (FIG. 2a) as dump body 10 returns to a horizontal position.

Figure 3:
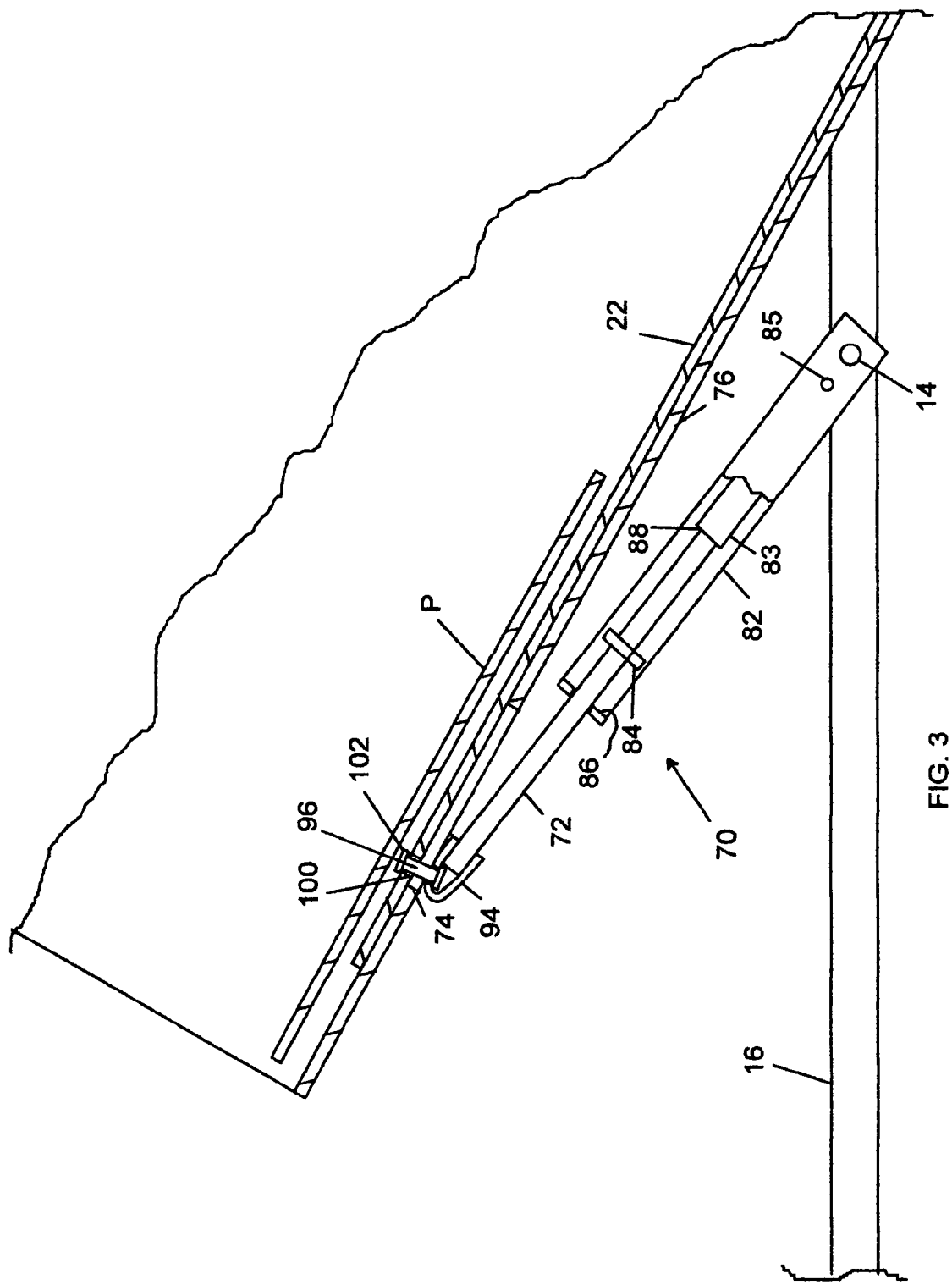
FIG. 3 depicts an embodiment of the instant invention.

Another embodiment of the inventive concept is depicted in FIG. 3 for a dump truck application. While the prior embodiments show the link mechanisms 12 mounted to sides of the dump bed, such a mounting may be impractical for a dump truck due to the severe operating environment within which a dump truck is operated. For instance, a front end loader or backhoe loading dirt into a dump truck frequently bangs into a side of the dump bed, which would subject the link mechanisms to damage. In order to overcome this, the link mechanisms may be mounted underneath the dump bed as shown in FIG. 3. In this embodiment, a pair of link mechanisms 70 (only one shown) may be employed, with a link portion 72 of each link mechanism connecting through a slot 74 in a floor 76 of a dump truck bed to a scraper carriage 78.

Figure 3A:
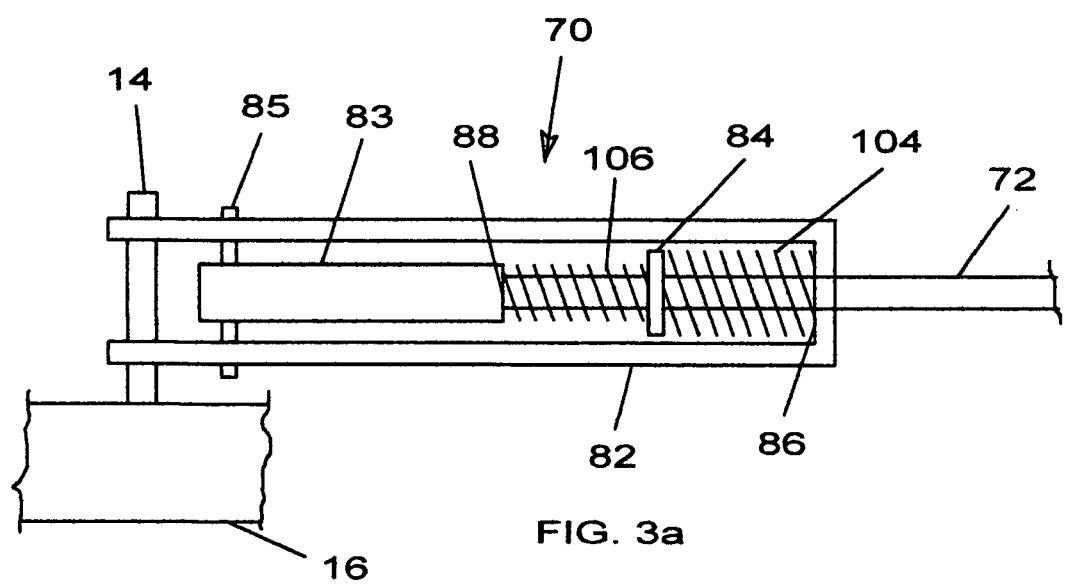
FIGS. 3a-3c illustrate operation of another embodiment of the instant invention.
Figure 3C:
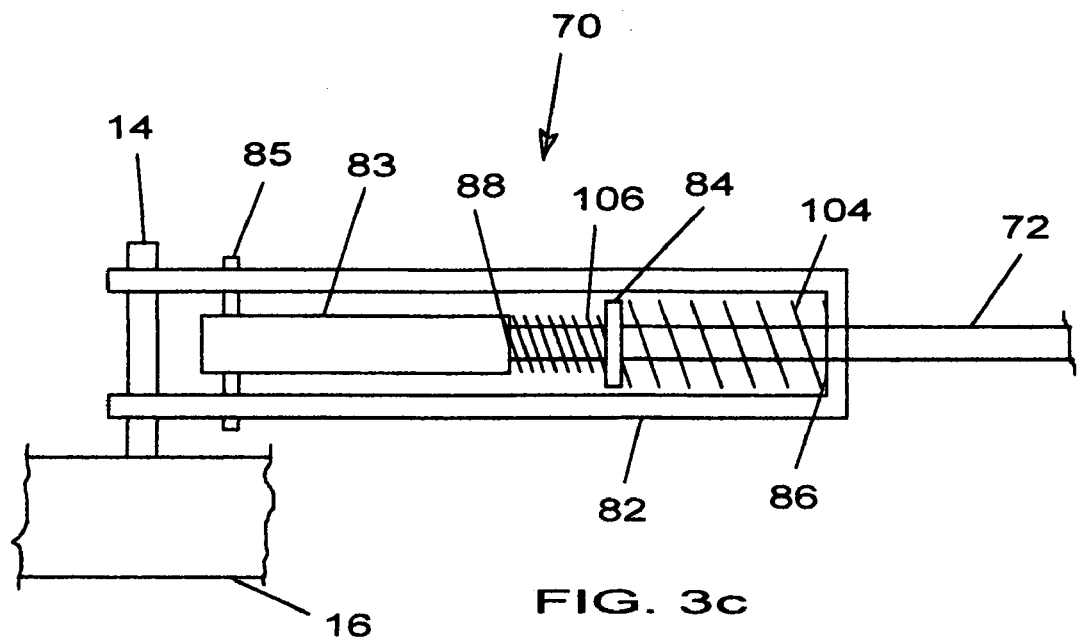
Figure 3B:
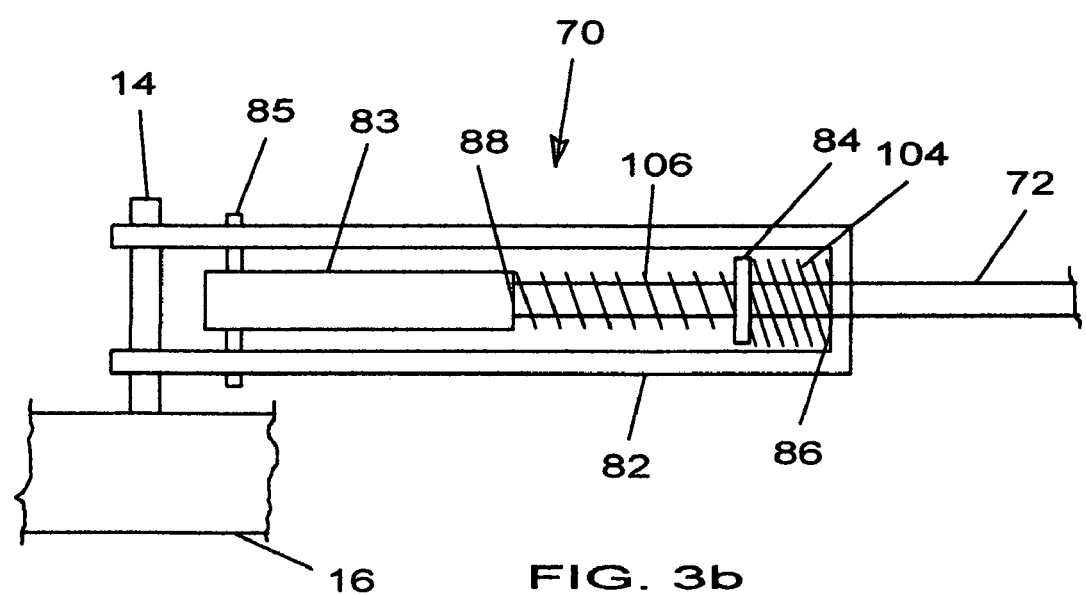

Referring to the partial view of FIGS. 3a and 3b, side and top views respectively, each link mechanism 70 may be embodied having an elongated U-shaped member 80 pivotally attached, as by hinge pin 14 as described above, to a frame member 16 of the dump truck. Strap member 80 encloses a guide 82, with extensible link portion 72 disposed for movement into and out of guide 82 through an opening in an end of strap member 80. A stop 84, which may be a heavy pin or disk welded to link 72, abuts a stop 86 on guide 82 and a stop formed by an end 88 of strap member 80. Guide 82 may be pinned or otherwise attached as shown by a pin to strap member 80, or pivotally attached to pin 14 in common with strap member 80. With this construction, link 72 may freely extend from guide 82 until stop 84 contacts end 88 of strap member 80, and can retract into guide 82 until stop 84 contacts stop or end 86 of guide 80, thus defining maximum and minimum lengths of the embodied extensible link 72, respectively.

As stated, strap member 80 has a hinge connection 14 to a truck frame member 16 and can be realized, for example, via a heavy pin or boss 92 projecting from a side of truck frame 16, and is rotatably captured as shown by a hole extending through both portions of strap member 80. As shown in FIG. 3, a cap 94 or the like may be fixed to an end of link 72, with a driving member, which may be a large bolt 96, loosely attached to cap 94 protrudes through a bed floor slot 98 and operably connects to scraper carriage 22 via an opening 100 in a respective side of scraper carriage 22. This connection and structure accomplishes the same kinematic functions of carriage hinge 23 as shown in FIGS. 1, 2a-2c; that is, during dump bed inclination, link 80 slidably urges scraper carriage 22 longitudinally along bed floor 20 while the loose bolt 100/opening 102 connection allows pivoting of the link member as extensible link 72 rotates about hinge connection 14. This bolt/opening connection substitution for a hinge connection 23 as shown in FIGS. 1, 2a-2c is possible because only a small range of rotation is required of carriage hinge 23, as can be observed in FIGS. 2a-2c. Note that driving rod or bolt 100 is fitted with an enlarged head or top 102 to secure this connection and prevent unintended separation of scraper carriage 22 and link 80 during dumping operations. In addition, to facilitate the hinge action of bolt 100 as the dump bed is raised and lowered, and as noted, opening 100 in scraper carriage 22 may be slightly larger than a diameter of bolt 96, allowing the bolt to tilt as the dump bed is raised and lowered. Likewise, bolt 96 may be similarly attached to cap 94 to achieve the same tilting function when the dump bed is raised and lowered.

If needed or desired, and as shown in FIGS. 3a-3c, a compression spring 104 may be located between stop 84 on link 72 and stop 86 on guide 82, and another compression spring 106 may be located between stop 84 and stop 88 of guide 82. Strength of these springs would be selected in accordance with usage, and for dump truck usage, may be on the order of a suspension spring for a light automobile. Here, when a loaded dump bed is raised to the position shown in FIG. 2b and only part of the load is dumped, as where wet dirt is being dumped, pressure of the load remaining in the dump bed prevents movement of the scraper carriage and blades and causes springs 104 to be compressed with further elevation of the dump bed, as shown in FIG. 3*b*. At a point where the spring compression overcomes resistance from the load, the scraper blades will suddenly be released, which "jogs" the remaining load so that it is discharged from the dump bed. In the event the springs compress fully without being released, the effect is the same as described above with respect to FIG. 2*b*, with the compressed springs serving as stops to draw the scraper blades across the dump bed until sufficient load is discharged, whereupon the springs are released to jog the remaining load from the bed.

Springs 104 serve to protect the scraper and link mechanisms from damage in the event a sufficiently large and hard object, such as a rock or tree limb, becomes jammed between scraper blades and a part of the dump bed, such as may occur between the first scraper blade and the doghouse. Here, during lowering of the dump bed, if such jamming occurs, springs 106 will compress as shown in FIG. 3*c* without causing damage to the scraper carriage or link assemblies. The object causing the jam may be cleared by again raising the dump bed, or cleared during the next filling and dumping cycle.

FIG. 4 displays a plan view of an embodiment of a scraper carriage 22 as it lies in a pre-scrape position on a bed floor of a dump body, as for example with a dump truck. A post scraping configuration is shown in dashed lines. Reference numerals of this embodiment are generally as shown in FIGS. 1, 2*a*-2*c*. As shown, scraper carriage 22 is configured with transverse blades 24 affixed to side carriage members 32 at each side thereof, the blades 34 longitudinally spaced between a lower end 35 adjacent a dumping end 37 of the dump bed 18, and an upper end 39 of dump bed 18. The scraper blades may be constructed of steel, such as T1 steel, may be 2"-3" in width, and between ¼-¾ inch thick, and as shown extend across the width of the dump bed. T1 steel is a spring steel, its use as scraper blades having been discovered to be particularly advantageous in that after being struck or deformed by heavy loads, such as large rocks, the scraper blade will assume its original configuration. While specific dimensions are described, it should be apparent that other dimensions of scraper blades may be used. In addition, and as shown, the scraper blades are configured to generally lie flat against the dump bed. As earlier described, upper end 39 of the scraper carriage is particularly configured to fit around a structure commonly known as a doghouse, which structure enclosing on a lower side thereof a hydraulic ram and associated structure for pivoting this end of the dump bed upward. Significantly, scraper carriage frame 30 has a total length that is approximately equal to a dump bed floor length decreased by a length D approximately equal to the scraping stroke produced by the extensible link apparatus. As will be apparent to one skilled in the art, adjacent blade spacing D' for each of the scraper blades is also no more than carriage scraping stroke length D in order to scrape the entire dump body bed floor by a single stroke of length D. Referring again to FIGS. 3, 4, and in some embodiments, a narrow rectangular cover plate P may be attached to each side of the carriage frame extending from an upper end 32 thereof to just behind bolt 96 so that when the carriage is moved along bed 20 during a scraping stroke, the cover plate covers slot 98. Each cover plate P may be about 3" in width and approximately 6 feet in length, and located on carriage frame 30 such that each bed floor slot 98 (FIG. 3) remains covered during a dumping operation in order to substantially prevent bulk material from falling out of the dump body bed through the bed floor slot 98 and/or into the scraper-link connection. In general, cover plates P should be kept as small as possible in width because this area may accumulate adhering bulk material because it will not itself be scraped. Furthermore, cover plates P should be thick enough to maintain shape under a full bulk material load, and this will depend on material of construction and supporting carriage frame. Typically, cover plates P may also be of T1 steel. Cover plates P will be at least as long as the sum of bed floor slot length plus scraper carriage stroke and wide enough to cover the bed floor slot, which as described for a dump truck the cover plates may be 3" wide and 6 feet or so long. In other embodiments, where the side frame members 26 are constructed of angle iron, as will be described, the flat side of the angle iron may serve to cover slot 98 during a scraping stroke. In other embodiments where a flat side frame member 26 is used, such a flat frame member may also be sufficiently wide so as to serve to cover slot 98.

As stated, scraper blades 24 of the embodiment depicted in FIG. 4 may be fabricated from flat plates of T1 steel and are rigidly attached to carriage frame 26 along the sides as shown, and generally lie flat against the dump bed floor 20. This carriage configuration is structurally rigid with respect to dislodging and moving obstructions and breaking adherences as it slides on dump bed floor 20. However, it has been found that one or more longitudinal carriage retainers 37 may be useful in preventing scraper carriage 32 from being pushed up and away from a bed floor when scraping tough, hard and strongly-adhering deposits and particles. FIG. 4 depicts one such carriage retainer 37 located near a longitudinal centerline of the dump bed, embodied as a metal bar or rod disposed longitudinally with the dump bed, and just above the blades (with blades touching the bed floor) and rigidly attached at both ends to the dump bed. Additional carriage retainers 37' (dashed lines) may also be used, and may be mounted generally between the center guide 37 and sides of the dump bed. As noted, retainers 37, 37' keep the scraper blades 24 flat against the dump bed, and prevent material from building up underneath the scraper blades.

Figure 6A:
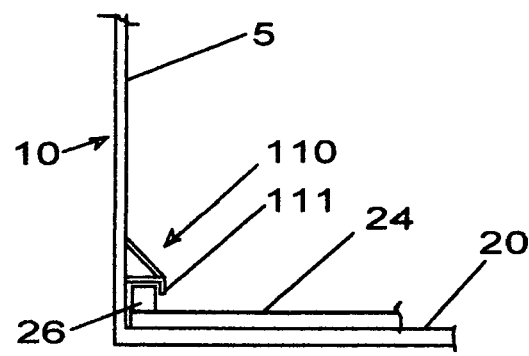
FIGS. 6a-6b illustrate construction details of retainers of the instant invention.
Figure 6B:
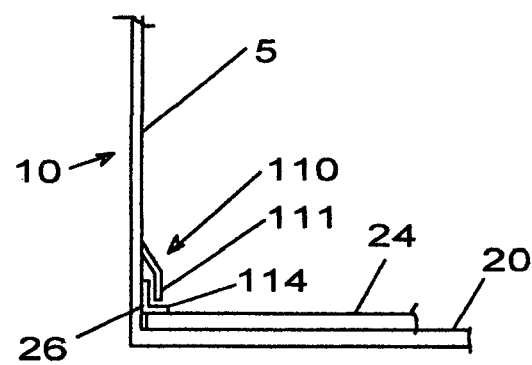

For assisting in preventing binding of the scraper carriage within the truck bed, and as shown in FIGS. 4, 6*a*, 6*b*, a plurality of longitudinal carriage guides 110 mounted to each interior side of the dump bed 10 near a floor thereof and just above the side scraper frame members 26 may also be used. These scraper guides have a lip or edge 111 (FIGS. 6*a*, 6*b*) that overlaps an inboard edge of each of the frame members, keeping the entire scraper centered between the dump bed sides. In general, these guides prevent binding that otherwise may occur if the scraper becomes twisted within the dump bed by holding frame members 26 closely positioned against sides of the dump bed along their length. However, the forces exerted on each side of the scraper carriage by the extensible links, also on each side of the scraper carriage, should be sufficiently equalized so as to prevent binding of frame members 26 against interior sides of the dump bed. In addition, ends of the frame members 26 adjacent sides of the dump bed where binding could occur may be beveled or curved, which would also facilitate prevention of binding of the scraper carriage within the dump bed. In some instances, and as shown in FIG. 6*b*, the side frame members may be constructed of heavy angle iron 114, such a 4×4 or 6×6 angle iron, with one side of the angle iron welded to an upper side of the scraper blades, and the adjacent side of the angle iron against sides of the dump bed. In this instance, protrusion of scraper guides 110 that hold the scraper carriage in place along sides of the dump bed would be minimal as they would only need to extend inward from the walls of the dump bed only slightly more than the thickness of the angle iron against the wall.

As should be apparent to one skilled in the art, mechanical equivalents of elements and combinations of elements of the inventive apparatus are contemplated in the scope of applicant's inventive concept. For example, an extensible link 150 (FIGS. 5*a*-5*c*) rotatably connected at a lower end 152 to a base 154 via a link hinge 156 can be equivalently achieved in an embodiment depicted in FIGS. 5*a*-5*c*. Here, an elongated flat extensible link 150 has a lower longitudinal slot 158 which slidably and rotatably captures a boss 160 attached to base 154 from which the dump bed also pivots as shown in FIG. 1. While not shown, boss 160 would be capped at an outer end to fully capture link 150. For the range of movements required during a dumping operation, sequentially shown in FIGS. 5*a*-5*c*, this embodiment accomplishes both the extensible feature of an extensible link as described above, and rotational features of a link hinge. Another example of a mechanically equivalent element is previously described in the embodiment depicted in FIG. 3 wherein for the modest rotation required, a loose bolt 96/opening 100 connection is mechanically equivalent to a carriage hinge connection. Here, a heavy-duty knuckle joint connection such as or similar to those found in vehicle suspension systems may also be used.

Additional variations of the inventive apparatus are contemplated within applicant's scope of invention. Here, only a single extensible link mechanism may be employed, and which may be located near a mid-plane of the base and dump body. A further embodiment contemplates a dump body having a longitudinally-uniform shaped bed (i.e., one having a non-planar bed floor). This embodiment's operatively-designed scraper carriage has attached scraper blades having contours conforming to a shaped bed.

Embodiments of applicant's invention previously described have been depicted as applied to dump bodies inclined by elevating an upper end of a dump body relative to a hinged opposite discharge end. It should be apparent to one skilled in the art, that Applicant's inventive apparatus also applies, with appropriate configuration changes, to dump bodies that are inclined by lowering (for example by dropping) a discharge end relative to a hinged upper end.

Having thus described my invention and the manner of its use, it should be apparent to those skilled in the relevant arts that inconsequential changes may be made thereto that fairly fall within the scope of the following appended claims, wherein I claim:

1. Apparatus comprising:
    a transportation vehicle including a vehicle frame,
    a dump body on said vehicle frame and configured to be lifted at one end from said vehicle frame, with a dump opening at an opposite end of said dump body, said dump body further comprising a floor;
    a scraper assembly longitudinally movable along said floor, and,
    at least one first pivoting connection on said scraper assembly,
    at least one second pivoting connection on said vehicle frame,
    at least one link between said first pivoting connection and said second pivoting connection, said link further comprising a first stop positioned on said link at a point of partial inclination of said dump bed to automatically urge said scraper assembly to begin a scraping stroke along said floor toward said dump opening, with further inclination of said dump body beyond said point of partial inclination pulling said scraper assembly toward said dump opening, thereby scraping material floor free of undumped or clumped said material.

2. Apparatus as set forth in claim 1 wherein said at least one link further comprises;
    two links, each of said two links connected at one end via a respective said second pivoting connection to said vehicle frame,
    a respective slot in said dump body or said floor thereof through which an opposite end of each said link extends and connects to said first pivoting connection on said scraper assembly.

3. Apparatus as set forth in claim 1 wherein a stroke of said scraper assembly is a predetermined distance between said one end of said dump body and said opposite end of said dump body, said predetermined distance being a distance necessary for said scraper assembly to fully traverse said floor.

4. An apparatus as set forth in claim 1 wherein said link is an extensible link that operates over a variable length between a minimum length and a maximum length.

5. An apparatus as set forth in claim 4 wherein as said dump bed is raised and said maximum length of said extensible link is reached, said extensible link pulls said scraper assembly across said floor toward said dump opening with further inclination of said dump body.

6. An apparatus as set forth in claim 4 wherein as said dump bed is lowered and said minimum length of said extensible length is reached, said extensible link pushes said scraper assembly to said one end of said dump body opposite from said dump opening.

7. An apparatus as set forth in claim 4 wherein said extensible link further comprises an extending link portion, and a first spring that biases said extending link portion inward as said scraper assembly is pulled downward to clear said floor of material.

8. An apparatus as set forth in claim 7 wherein said extensible link further comprises a second spring that biases said extending link portion outward as said scraper assembly is pushed toward said one end.

9. An apparatus as set forth in claim 1, wherein said scraper assembly further comprises:
    a scraper frame on said floor, said scraper frame shorter than said floor by a distance of about said scraping stroke said floor, and
    a plurality of spaced scraping blades attached to said frame, said scraping blades extending across said floor in a direction perpendicular to said scraping stroke.

10. An apparatus as set forth in claim 9 wherein spacing between said scraping blades is approximately equal to a length of said scraping stroke.

11. An apparatus as set forth in claim 10 wherein said scraper blades are constructed of spring steel.

12. An apparatus as set forth in claim 1 further comprising at least one retainer extending generally a length of said dump bed and over said scraper blades, to hold said scraper blades on or near said floor.

13. An apparatus as set forth in claim 1 further comprising one or more scraper frame guides, each scraper frame guide of said scraper frame guides having a lip for capturing and guiding a respective side scraper frame member of said scraper assembly along a respective side of said floor.

14. An apparatus as set forth in claim 13 wherein each said side scraper frame member is constructed of angle iron, with respective said lips capturing an upwardly extending portion of said angle iron of said side frame member of said scraper assembly.

15. Apparatus as set forth in claim 1 further comprising a second stop on said link positioned at a point of partial declination of said dump body corresponding to a shortest length of said link, wherein said link begins to push said scraper assembly toward said one end of said dump body when said dump body is lowered past said point of partial declination of said dump body.

16. Apparatus as set forth in claim 15 wherein, during lowering of said dump body, said first pivoting connection and said second pivoting connection move towards each other a distance defined by a fully raised position of said dump bed and said point of partial declination without cooperation between said first pivoting connection and said second stop.

17. Apparatus as set forth in claim 1 wherein said link has two operating lengths, a first operating length defined by said point of partial inclination of said dump body wherein said link begins to pull said scraper assembly toward said dump opening, and a second operating length defined by a point of partial declination of said dump body when said link begins to push said scraper assembly toward said one end of said dump body.

18. Apparatus as set forth in claim 17 wherein said first operating length is longer than said second operating length.

19. Apparatus as set forth in claim 18 wherein a difference in length between said first operating length and said second operating length is defined by a difference of said point of partial inclination of said dump body and said point of partial declination of said dump body.

20. Apparatus as set forth in claim 17 wherein said point of partial inclination is defined by a distance between said first pivoting connection and said first stop when said first stop begins to cooperate with said first pivoting connection to begin to move said scraper assembly toward said dump opening.

21. Apparatus as set forth in claim 17 wherein said point of partial declination is defined by a distance between said first pivoting connection and said second stop when said second stop begins to cooperate with said first pivoting connection to begin to move said scraper assembly toward said one end of said dump body.

22. Apparatus as set forth in claim 1 wherein, during inclination of said dump body, said first pivoting connection and said second pivoting connection move apart from each other a distance defined by a fully lowered position of said dump bed and said point of partial inclination without cooperation between said first pivoting connection and said first stop.

23. Apparatus for scraping clumped material in a dump bed free comprising:
   a vehicle frame,
   a dump body comprising a floor, and one end that is lifted to induce inclination of said dump body, thereby dumping material from a dumping end said dump body,
   a scraper assembly on said floor of said dump body, said scraper assembly having a frame and a plurality of scraper blades that scrape said floor, said scraper assembly movable from a first position wherein one end of said scraper assembly thereof is adjacent said one end to a second position wherein an opposite end of said scraper assembly is adjacent said dumping end of said dump body,
   a first extensible link extending through a first slot in said dump body and connected between said frame and one side of said scraper assembly,
   a second extensible link extending through a second slot in said dump body and connected between said frame and an opposite side of said scraper assembly, said first extensible link and said second extensible link configured to move said scraper frame automatically at a selected inclination and a selected declination of said dump body.

24. An apparatus as set forth in claim 23 wherein said scraper assembly further comprises:
   a frame extending between said opposed sides,
   a plurality of spaced scraper blades attached to said frame, and extending across said frame between said opposed sides, said frame of a length short of a length of said floor equivalent to approximately a said spacing between said scraper blades.

* * * * *